United States Patent
Cordova et al.

(10) Patent No.: US 9,744,741 B2
(45) Date of Patent: Aug. 29, 2017

(54) MATERIAL FOR RADOMES AND PROCESS FOR MAKING THE SAME

(75) Inventors: David Cordova, Laytonsville, MD (US); Eelco van Oosterbosch, Urmond (NL); Chae Thompson, Mount Holly, NC (US); Chris Griffin, Chester, VA (US)

(73) Assignee: DSM IP ASSETS B.V., Heerlen (NL)

(*) Notice: Subject to any disclaimer, the term of this patent is extended or adjusted under 35 U.S.C. 154(b) by 927 days.

(21) Appl. No.: 13/993,853

(22) PCT Filed: Dec. 14, 2011

(86) PCT No.: PCT/EP2011/072735
§ 371 (c)(1),
(2), (4) Date: Dec. 5, 2013

(87) PCT Pub. No.: WO2012/080317
PCT Pub. Date: Jun. 21, 2012

(65) Prior Publication Data
US 2014/0078016 A1 Mar. 20, 2014

(30) Foreign Application Priority Data

Dec. 14, 2010 (EP) .................................... 10194954

(51) Int. Cl.
| | |
|---|---|
| *H01Q 1/42* | (2006.01) |
| *B32B 5/26* | (2006.01) |
| *B32B 27/12* | (2006.01) |
| *B32B 27/32* | (2006.01) |
| *B32B 27/28* | (2006.01) |
| *B32B 27/30* | (2006.01) |
| *B29C 65/02* | (2006.01) |
| *B32B 5/28* | (2006.01) |
| *B32B 37/08* | (2006.01) |

(52) U.S. Cl.
CPC ................ *B32B 5/26* (2013.01); *B29C 65/02* (2013.01); *B32B 5/28* (2013.01); *B32B 27/12* (2013.01); *B32B 27/283* (2013.01); *B32B 27/304* (2013.01); *B32B 27/32* (2013.01); *H01Q 1/42* (2013.01); *B32B 37/08* (2013.01); *B32B 2255/02* (2013.01); *B32B 2255/10* (2013.01); *B32B 2255/26* (2013.01); *B32B 2262/0253* (2013.01); *B32B 2305/18* (2013.01); *B32B 2307/20* (2013.01); *B32B 2309/105* (2013.01); *B32B 2309/12* (2013.01); *B32B 2327/06* (2013.01); *B32B 2457/00* (2013.01); *Y10T 156/10* (2015.01); *Y10T 428/24975* (2015.01); *Y10T 442/2049* (2015.04); *Y10T 442/291* (2015.04); *Y10T 442/3041* (2015.04)

(58) Field of Classification Search
CPC .................. H01Q 1/42; B29C 65/02
USPC .......................................... 343/872; 428/216
See application file for complete search history.

(56) References Cited

U.S. PATENT DOCUMENTS

| | | | |
|---|---|---|---|
| 5,408,244 A | 4/1995 | Mackenzie | |
| 5,709,946 A | 1/1998 | Jackson et al. | |
| 6,028,565 A * | 2/2000 | Mackenzie | H01Q 1/422 343/872 |
| 6,107,976 A * | 8/2000 | Purinton | H01Q 1/42 343/872 |
| 6,975,279 B2 * | 12/2005 | Delgado | H01Q 1/422 343/787 |
| 7,981,504 B2 * | 7/2011 | Nelson | H01B 3/445 428/319.3 |
| 2005/0057423 A1 * | 3/2005 | Delgado | H01Q 1/42 343/872 |
| 2007/0077370 A1 | 4/2007 | Ulcar | |
| 2007/0252775 A1 * | 11/2007 | Munk | H01Q 1/421 343/872 |
| 2007/0292674 A1 * | 12/2007 | Morin | B32B 27/02 428/292.1 |
| 2009/0284436 A1 * | 11/2009 | McCarthy | H01Q 1/02 343/872 |
| 2010/0188833 A1 * | 7/2010 | Liang | H01B 1/04 361/818 |
| 2011/0199281 A1 * | 8/2011 | Morton | H01Q 1/42 343/872 |
| 2014/0327595 A1 * | 11/2014 | Van Oosterbosch | B29C 70/04 343/872 |
| 2017/0080678 A1 * | 3/2017 | Bhatnagar | B32B 5/022 |

FOREIGN PATENT DOCUMENTS

| | | |
|---|---|---|
| EP | 0200547 | 11/1986 |
| EP | 0205960 | 12/1986 |
| EP | 0213208 | 3/1987 |
| EP | 0472114 | 2/1992 |
| EP | 1 852 938 | 11/2007 |
| GB | 846868 | 8/1960 |
| GB | 2042414 | 9/1980 |
| GB | 2051667 | 1/1981 |
| WO | 91/12136 | 8/1991 |
| WO | 01/73173 | 10/2001 |
| WO | 2005/066401 | 7/2005 |
| WO | WO 2005/065910 | 7/2005 |
| WO | WO 2010/003769 | 1/2010 |
| WO | 2010/066819 | 6/2010 |
| WO | WO 2010/122099 | 10/2010 |

OTHER PUBLICATIONS

Sharma et al. "Laminate Materials with Low Dielectric Properties", Presented at IPC Printed Circuits Expo, 2002, pp. S05-1-1 to S05-1-8.*

(Continued)

*Primary Examiner* — Huedung Mancuso
(74) *Attorney, Agent, or Firm* — Nixon & Vanderhye P.C.

(57) ABSTRACT

The invention relates to a material comprising at least one laminate component containing polymeric fibers wherein the material has a loss tangent of less than $8 \times 10^{-3}$ radians as measured at a frequency chosen from the group of frequencies consisting of 1.8 GHz; 3.9 GHz; 10 GHz; 39.5 GHz; and 72 GHz.

17 Claims, No Drawings

(56) References Cited

OTHER PUBLICATIONS

Felbecker et al. "Estimation of Permitivitty and Loss Tangent of High Frequency Materials in the Millimeter Wave Band using a Hemispherical Open Resonator", Research Gate, Nov. 2011, pp. 2-9.*

International Search Report for PCT/EP2011/072735, mailed Mar. 29, 2012.

De Vries, H.P.J., "Design, fabrication and testing of a Dyneema / polyethylene radome for airborne remove sending", NLR, (Jan. 1, 1998), pp. 1-11.

Hu, C-L J. et al., "Electrical properties of polyethylene fiber composites", National Sampe Symposium and Exhibition (Proceedings), (Jan. 1, 1986), pp. 1413-1425.

Cordova, D.S. et al., "Spectra reinforced composite systems for high impact/microwave transparent radar domes", National Sampe Symposium and Exhibition (Proceedings), vol. 2, (Jan. 1, 1988), pp. 574-585.

Cravey, R.L., "Complex permittivites of candidate radome materials at W-band", NASA Technical Memorandum 110344, (May 1997), pp. 1-17.

Ananthanarayan, V.T. et al., "Development of fabric sintering / compaction process to produce porous UHMW polyethylene composites", Journal of Biomaterials Applications, Technomic, vol. 16, No. 1, (Oct. 1, 2001), pp. 139-148.

Marissen, R. et al., "Creep forming of high strength polyethylene fiber prepregs for the production of ballistic protection helmets", Composites Science and Technology, vol. 70, No. 7, (Jul. 1, 2010), pp. 1184-1188.

Rao, B.R., "An optimization technique for the design of multi-frequency radomes", (May 7, 1990), pp. 1200-1203.

Thorstad, *Emulsions-why and how they are used*, Modern Plastics, Jul. 1959, pp. 83-84.

Nakajima, *Advanced fiber spinning technology*, Chapters 8 and 9.1 Woodhead Publishing Ltd., 1994.

Clarke et al, *Fabry-Perot and open resonators at microwave and millimeter wave frequencies*, 2-300 GHz, J.Phys.E:Sci.Instrum., vol. 15, 1982.

*A guide to characterization of dielectric materials at RF and microwave frequencies*, ISBN 0 904457 38 9, The Institute of Measurement and Control (2003).

Buehner et al, *Waterborne Epoxy Dispersions Provide Compliant Alternatives*, Adhesives Age, 1991, pp. 24-26.

Horrocks et al; Handbook of Technical Textiles, vol. 1, Chapters 4, 5, 6 and 11 (2000).

Jackson, *Guidelines to formulation of waterborne epoxy primers—An evaluation of anti-corrosive pigments*, Polymers Plant Colour Journal, vol. 180, Oct. 17, 1990, No. 4270, pp. 608-621.

* cited by examiner

MATERIAL FOR RADOMES AND PROCESS FOR MAKING THE SAME

This application is the U.S. national phase of International Application No. PCT/EP2011/072735, filed 14 Dec. 2011, which designated the U.S. and claims priority to EP Application No. 10194954.3, filed 14 Dec. 2010, the entire contents of each of which are hereby incorporated by reference.

FIELD OF THE INVENTION

This invention is in the field of materials having remarkable electromagnetic properties, in particular within a broadband of frequencies. This invention also relates to radome constructions and in particular to broadband radome constructions.

BACKGROUND OF THE INVENTION

Radome constructions, or simply radomes, are highly electromagnetically transparent structures used for covering and protecting antennas.

Antennas and in particular large antennas such as radar installations, wireless telecom infrastructure and radio telescopes often need a radome or a covering structure of some kind to protect them from weather, e.g. sunlight, wind and moisture. The presence of the radome is particularly mandatory for antennas placed in regions where high winds or storms often occur, in order to protect the antennas from hale and impacts from projectiles such as debris carried by the wind.

Radome designs usually address structural requirements, including aerodynamic shape, rigidity, and resistance to weather, shock, impact, vibrations and biodegradations, as well as electromagnetic transparency, e.g. a minimal reflection and/or absorption of passing electromagnetic energy, with the aim of minimizing an electromagnetic energy loss.

Structural requirements for radomes are usually met by using composite materials having suitable mechanical properties when constructing a radome and in particular a radome wall. However, the known composite materials tend to have inadequate electromagnetic properties, e.g. a rather high dielectric constant and a rather high dielectric loss, especially at high and ultrahigh frequencies. It was also noticed that the known composite materials may have inadequate electromagnetic transparency and in particular a high electromagnetic absorption and/or being highly reflective.

An example of a radome manufactured from a composite material having suitable mechanical properties is discloses in an article by H. P. J. de Vries, i.e. "*Design, fabrication and testing of a Dyneema®/polyethylene radome for airborne remote sensing*", Nationaal Lucht-en Ruimtevaartlaboratorium, NLR, Amsterdam, The Netherlands, 1 Jan. 1998, Amsterdam, The Netherlands. Therein a radome comprising a composite material containing low density polyethylene (LDPE) films and a stack of fabrics made from Dyneema® fibers is disclosed, the radome having a loss tangent of 0.0002 (2e-4). Although unclear at which electromagnetic frequency the loss tangent was measured, the present inventors analyzed such a radome and determined that for high and ultrahigh frequencies, the electromagnetic properties and in particular the electromagnetic transparency thereof can still be improved.

A further disclosure of radomes based on composite materials containing polyethylene fibers is given in "*Electrical properties of polyethylene fiber composites*" by Chia-Lun J. Hu et al, $31^{st}$ International SAMPE Symposium, Apr. 7-10, 1986. Therein it is reported a radome comprising a composite material containing Spectra 900 fibers and an epoxy matrix and having a loss tangent measured at 10 MHz of about 1e-4. It was however observed that at frequencies of above 1 GHz (1000 MHz) the electromagnetic transparency of such a radome is rather poor. This is shown in "*Spectra® reinforced composite systems for high impact/microwave transparent radar domes*" by David S. Cordova et al., $2^{nd}$ International SAMPE Electronics Conference, Jun. 14-16, 1988, which investigates the behavior of such composite materials at frequencies in the X-band. Therein it is shown that a radome based on Spectra® fibers and epoxy matrices has a loss tangent as measured in the X-band of about 0.0044 (4.4e-3).

A further investigation on the behavior of radomes made of Spectra® fibers embedded in an epoxy radome at frequencies in the W-band, i.e. higher than X-band, is given by a NASA Technical memorandum (110344) entitled "*Complex Permittivities of Candidate Radome Materials at W-band*" by Robin L. Cravey, May 1997. Therein it is shown that such a radome has a loss tangent as measured in the W-band of about 0.02 (2e-2).

Polyolefins other than polyethylenes can also be used in composite materials suitable to manufacture radomes thereof. An example of a radome made from self reinforced polypropylene is given in EP 1 852 938, the radome having a loss tangent as measured at 10 GHz of about 0.0015 (1.5 e-3). However, such radomes usually have poorer electromagnetic properties than those using polyethylenes.

To improve however the electromagnetic properties of a radome and in particular its electromagnetic transparency, several solutions were proposed by various inventors. One approach to minimize in a material the reflection of passing electromagnetic energy and thus to minimize the electromagnetic energy loss, also referred to as electromagnetic signal loss or simply as signal loss, is to choose a certain material thickness, or in case of a radome, a certain radome wall thickness. Said thickness is typically adjusted with due regard to the electromagnetic properties of the material as well as to the characteristics of an electromagnetic signal interacting therewith, e.g. number of energy or signal beams, switching speeds, angles of incidence, said signal's wavelength or frequency. One particularly preferred solution is to adjust said thickness with due regard to the dielectric constant of the material and to the wavelength of the signal, so that waves reflected from a front surface of said material and from a back surface of the material cancel each other by destructive interference.

Another approach, to minimize in a material the reflection of passing electromagnetic energy, is to interpose on the surface of the material a quarter-wavelength thick layer having a refractive index intermediate that of air and that of the material. Yet another approach, to minimize in a material the reflection of passing electromagnetic energy, is by using a composite material containing a foamed plastic material.

Various composite materials and radomes with radome walls containing thereof and designed using at least one of the hereinabove mentioned approaches are to be found in U.S. Pat. No. 4,980,696; GB 846 868; U.S. Pat. Nos. 4,590,027; 4,783,666; and 5,059,972. However, the composite materials used therein for constructing the radome walls, even when carefully designed to minimize the reflection of passing electromagnetic energy, function optimally only for an electromagnetic energy at a matched wavelength. Moreover, the allowable energy loss throughout the radome wall limits their maximum thickness to relatively thin radome walls, which in turn deleteriously influences their structural properties. In particular it was observed that thin radome walls may have insufficient structural integrity in particular for large size radomes, especially those utilized in conjunction with antennas operating at high frequencies in the range of microwave frequencies, i.e. above 1 GHz.

To minimize the absorption of electromagnetic energy in a material and in case of radomes in the walls thereof, low dielectric constant materials were used for the construction of the radome walls. However, due to the fact that low dielectric constant materials often do not meet the structural requirements, higher dielectric constant materials with better mechanical properties are used in conjunction therewith. Multi-layer materials and radome walls containing thereof were developed to compensate for the above mentioned drawbacks, examples being found in U.S. Pat. Nos. 4,613,350 ; 4,725,475 ; 4,677,443 ; 4,358,772 ; 3,780,374 ; 5,408,244; and 7,151,504.

However, designing materials having an optimum combination of electromagnetic and mechanical properties is difficult and especially inefficient for frequencies above 10 GHz since such materials may show a rather large electromagnetic signal loss.

Numerous design attempts to obtain materials having superior electromagnetic transparency and radomes containing thereof are found in U.S. Pat. No. 7,151, 504; U.S. 2004/021985; U.S. 2006/0255948; U.S. 2007/0039683; U.S. 2007/0292674; U.S. 2008/0187734; U.S. 2008/0188153; U.S. 2008/0252552; U.S. 2009/0148681; U.S. 2009/0167628; and U.S. 2009/0207095. Most of these materials usually meet the structural requirements for various radome applications and have rather good electromagnetic properties for a matched wavelength of the electromagnetic signal interacting therewith. Some materials may also be suitably used for constructing broadband radomes, i.e. radomes utilized in conjunction with broadband antennas. For example several broadband materials for broadband radomes are reported in US 2008/0187734, which achieved at a matched frequency of 100 MHz a minimum dielectric constant of about 3.05 and a minimum dielectric loss of about 0.0015 ($1.5 \times 10^{-3}$) radians. However, the known broadband materials are effective typically at frequencies lower than microwave frequencies and usually said materials present a large dielectric loss at microwave frequencies.

Although the known materials have been found somewhat suitable for constructing radomes for antennas functioning at frequencies of up to 100 GHz, the electromagnetic signal loss in the radome walls have been found to be rather large. In particular, many applications are presently being developed requiring a greater sensitivity than hitherto. It should be recognized that at high frequencies in the range of 1 GHz and above, and in particular at ultra-high frequencies in the range of 50 GHz and above, designing materials having efficient electromagnetic properties is extremely challenging. For instance, very few materials have electromagnetic properties, e.g. a dielectric constant and/or a dielectric loss that would enable the manufacturing of an effective radome for antennas operating at frequencies higher than 50 GHz and even higher than 70 GHz. When using known materials in a radome for an ultra-high frequency antenna, it was observed that the antenna had a short operating range and its power had to be drastically increased to compensate for any signal loss. Increasing the antenna's power may in turn reduce the antenna's operating lifetime and also increases the operating cost due to high electricity consumption.

Faced with the above drawbacks, an object of the invention may thus be to provide a material which would enable the manufacturing of an efficient broadband radome, i.e. a radome which shows a good electromagnetic transparency over a large bandwidth and in particular in the microwave bandwidth, e.g. for frequencies up to 140 GHz and more in particular for frequencies between 1 GHz and 130 GHz.

Another object of the invention may be to provide a material which would enable the manufacturing of an efficient broadband radome, said material having reduced dielectric loss over a large bandwidth and in particular for frequencies between 1 GHz and 130 GHz. The dielectric loss is also referred to herein as loss tangent and is expressed in radians.

Another object of the invention may be to provide a material which would enable the manufacturing of an efficient broadband radome, said material having reduced dielectric loss for certain frequencies within the frequency range of between 1 GHz and 130 GHz.

Another object of the invention may be to provide a material which would enable the manufacturing of an efficient broadband radome, said material having a reduced variation of the dielectric loss over a large bandwidth and in particular for frequencies between 1 GHz and 130 GHz.

Another object of the invention may be to provide a material, which would enable the manufacturing of an efficient broadband radome, said material having excellent mechanical properties and/or offering suitable impact protection Another object of the invention may be to provide a method for making a material, said material being suitable for the manufacturing of an efficient broadband radome.

SUMMARY OF THE INVENTION

These and other objects of the invention may be accomplished with a material comprising a laminate component containing polymeric fibers wherein the material has an average loss tangent of less than $8 \times 10^{-3}$ radians as measured at frequencies within a frequency interval of between 1 GHz and 130 GHz, preferably of between 1 GHz and 72 GHz. By average loss tangent is herein understood a value of the loss tangent which is an average of the values for the loss tangent obtained by measuring said loss tangent at frequencies within the required frequency interval, e.g. of between 1 GHz and 130 GHz. Preferably, the values of the loss tangents measured at the frequencies of 1.8 GHz, 3.9 GHz, 10 GHz, 39.5 GHz and 72 GHz are used to calculate the average loss tangent of the material. These particular frequencies were chosen based upon the belief that most known antennas operate at least around one of these frequencies. Preferably, the average loss tangent is at most $6 \times 10^{-3}$ radians, more preferably at most $3 \times 10^{-3}$ radians, even more preferably at most $8 \times 10^{-4}$ radians, even more preferably at most $4 \times 10^{-4}$ radians, even more preferably at most $2 \times 10^{-4}$ radians, most preferably at most $1.3 \times 10^{-4}$ radians.

In a second embodiment, the invention provides a material comprising a laminate component containing polymeric fibers wherein the material has a loss tangent of less than $8 \times 10^{-3}$ radians as measured at any frequency chosen from the group of frequencies consisting of 1.8 GHz; 3.9 GHz; 10 GHz; 39.5 GHz; and 72 GHz. Preferably, said loss tangent is at most than $6 \times 10^{-3}$ radians, more preferably at most $3 \times 10^{-3}$ radians, even more preferably at most $8 \times 10^{-4}$ radians, even more preferably at most $4 \times 10^{-4}$ radians, even more preferably at most $2 \times 10^{-4}$ radians, most preferably at most $1.3 \times 10^{-4}$ radians.

In a third embodiment, the invention provides a material comprising a laminate component containing polymeric fibers wherein the material has a loss tangent of less than $1\times10^{-3}$ radians as measured at a frequency of 72 GHz. Preferably, the loss tangent is at most than $8\times10^{-4}$ radians, more preferably at most $4\times10^{-4}$ radians, even more preferably at most $2\times10^{-4}$ radians, even more preferably at most $1.5\times10^{-4}$ radians, most preferably at most $9.0\times10^{-5}$ radians.

In a fourth embodiment, the invention provides a material comprising a laminate component containing polymeric fibers wherein the material has a coefficient of variation of the loss tangents which are measured within a frequency interval of between 1 GHz and 130 GHz of at most 80%, preferably of at most 60%, more preferably of at most 50%, most preferably of at most 40%. Preferably, the coefficient of variation is calculated using the values of the loss tangents measured at the frequencies of 1.8 GHz, 3.9 GHz, 10 GHz, 39.5 GHz and 72 GHz. Preferably, the material of this embodiment has a loss tangent as measured at the frequency of 39.5 GHz of at most $2.5\times10^{-3}$ radians, more preferably at most $1\times10^{-3}$ radians, even more preferably at most $8\times10^{-4}$ radians, even more preferably at most $4\times10^{-4}$ radians, most preferably at most $2\times10^{-4}$ radians.

In a fifth embodiment, the invention provides a material comprising a laminate component containing polymeric fibers wherein the material has an average loss tangent of at most $10^{-2}$ radians as measured at frequencies within a frequency interval of between 39.5 GHz and 130 GHz, preferably of between 39.5 GHz and 100 GHz, more preferably of between 39.5 GHz and 72 GHz. Preferably, the average loss tangent is at most $2\times10^{-3}$ radians, more preferably at most $1\times10^{-3}$ radians, even more preferably at most $8\times10^{-4}$ radians, even more preferably at most $4\times10^{-4}$ radians, most preferably at most $2\times10^{-4}$ radians.

It was determined that the materials of the embodiments of the invention, or simply referred to herein as the inventive materials, preserve their good electromagnetic properties over a large bandwidth. It was also observed that the electromagnetic properties of the materials of the invention and in particular their loss tangent vary little within the extremely broad frequency range of from 1 GHz to 130 GHz. Such materials with such outstanding broadband electromagnetic properties were to inventors' knowledge never manufactured hitherto.

In particular it was observed that the electromagnetic properties of the inventive materials for frequencies around which most of the known antennas operate is also outstanding. In particular for extremely high frequencies, e.g. 72 GHz, the materials of the invention largely outperform the known materials used to manufacture radomes.

It was also observed that the inventive materials behave uniquely at ultra-high frequencies, e.g. 72 GHz, in that normal electromagnetic relaxation phenomena typically occurring in the known materials are occurring to a lesser extent in the inventive materials.

It was yet further observed that the inventive materials are lightweight and may have outstanding mechanical and impact properties, e.g. structural integrity; rigidity; resistance to weather factors such as high winds, impacts from wind carried debris; and even outstanding ballistic performance.

DETAILED DESCRIPTION OF THE INVENTION

According to the invention, the inventive materials comprise a laminate component containing polymeric fibers.

By fiber is herein understood an elongated body having a length much greater that its transverse dimensions, e.g. a diameter, a width and/or a thickness. The term fiber also includes various embodiments e.g. a filament, a ribbon, a strip, a band, a tape, a film and the like. A fiber may also have a regular cross-section, e.g. oval, circular, rectangular, square, parallelogram; or an irregular cross-section, e.g. lobed, C-shaped, U-shaped. The fibers may have continuous lengths, known in the art as filaments, or discontinuous lengths, known in the art as staple fibers. Staple fibers may be commonly obtained by cutting or stretch-breaking filaments. A yarn for the purpose of the invention is an elongated body containing many fibers.

In a special embodiment of the present invention, the polymeric fiber is a polymeric tape, i.e. the fiber has a tape-like shape. It is preferred, however not mandatory, that the tapes used in accordance with the invention are non-fibrous tapes, i.e. tapes obtained with a process different than a process comprising a step of producing fibers and a step of using, e.g. fusing, the fibers to make a tape. A suitable polymeric tape for the purposes of the present invention may be a tape having a cross sectional aspect ratio, i.e. the ratio of width to thickness, of preferably at least 5:1, more preferably at least 20:1, even more preferably at least 100:1 and yet even more preferably at least 1000:1. The width of the polymeric tape is preferably between 1 mm and 600 mm, more preferable between 10 mm and 400 mm, even more preferably between 30 mm and 300 mm, yet even more preferably between 50 mm and 200 mm and most preferably between 70 mm and 150 mm. The polymeric tape preferably has a thickness of between 1 µm and 200 µm and more preferably of between 5 µm and 100 µm. It was observed that by using polymeric tapes, the inventive materials showed excellent electromagnetic properties but also good mechanical properties.

Preferably, the laminate component comprises at least one laminae, more preferably the laminate component is a multilayered laminate component comprising a plurality of laminae. The laminae is also referred to in the art as layer or sometimes as monolayer. Preferably, the laminate component comprises at least two laminae, whereas good mechanical properties may be achieved when the laminate component comprises an even number of laminae. The number of laminae in the multilayered laminate component can be routinely determined by a skilled person in view of a desired weight, thickness or areal density of the multilayered laminate component.

Preferably, the laminae contains polymeric fibers wherein the polymeric fibers form a fabric, e.g. a woven, knitted, plaited, braided or a non-woven fabric or combinations thereof. Preferred fabrics are woven fabrics, suitable examples thereof including without limitation plain weave, rib, basket and matt weave and twill weave fabrics and the like. Knitted fabrics may be weft knitted, e.g. single- or double-jersey fabric or warp knitted. Examples of non-woven fabrics include a felt fabric and a unidirectional fabric, i.e. a fabric wherein a majority of polymeric fibers, e.g. at least 80 mass % of all fibers in the fabric, more preferably all fibers in the fabric, run in a substantially parallel fashion along a common direction. Further examples of woven, knitted or non-woven fabrics as well as the manufacturing methods thereof are described in "*Handbook of Technical Textiles*", ISBN 978-1-59124-651-0 at chapters 4, 5 and 6, the disclosure thereof being incorporated herein as reference. A description and examples of braided fabrics are described in the same Handbook at Chapter 11, more in particular in paragraph 11.4.1, the disclosure thereof being incorporated herein by reference. Good results in terms of electromagnetic and mechanical properties may be obtained when the laminae contains a unidirectional fabric or a woven fabric. Most preferred fabrics are woven fabrics, in particular plain or basket weaves.

According to the invention, any one of the inventive materials comprise a laminate component. However, it is not excluded that any one of the inventive materials may contain a plurality of laminate components. The number of the laminate components can be routinely determined by a skilled person in view of the desired weight, thickness or areal density of the inventive materials. Good electromagnetic properties may be obtained when the materials of the invention comprise only one, or in other words a single, laminate component.

In one embodiment, any one of the inventive materials comprises a laminate component containing at least one laminae wherein the at least one laminae comprises a single polymeric tape having a length and a width about the same as the length and width of the laminate component. Hereinafter, for the purpose of this embodiment such a tape is referred to as film. The dimensions of width and length of the polymeric film are thus dependant on the dimensions of the laminate component, which in turn are dependant on how the inventive materials are being used. The skilled person can routinely determine the lateral dimensions of said film. Preferably said film is anisotropic. By anisotropic is meant in the context of the present invention that two mutually perpendicular directions can be defined in the plane of the film for which the modulus of elasticity in a first direction is at least 3 times higher than the modulus of elasticity in the direction perpendicular to it. Generally the first direction of an anisotropic film is in the art also referred to as machine direction or drawing direction (or as direction of orientation) having the highest mechanical properties. Very good results may be obtained when the laminate component contains a plurality of laminae, each laminae containing the polymeric film, wherein said plurality of laminae are stacked such that the directions of orientation, i.e. the machine directions, of the polymeric film in two adjacent laminae are under an angle α of preferably between 45 and 135°, more preferably between 65 and 115° and most preferably between 80 and 100°. A method of preparing such anisotropic films is disclosed for example in WO2010/066819, which is incorporated herein by reference.

In a further preferred embodiment, any one of the materials of the invention comprises a laminate component comprising at least one laminae, said at least one laminae comprising a unidirectional fabric of polymeric fibers. Preferably, the polymeric fibers are polymeric tapes. Preferably, the laminate component comprises a plurality of laminae wherein preferably the fiber direction in one laminae is rotated with respect to the fiber direction in an adjacent laminae. When polymeric tapes are used to manufacture the laminae, the tapes in said laminae are unidirectionally aligned and run along a common direction with their lengths defining and being contained by a single plane. A gap may exist between two adjacent tapes, said gap being preferably at most 10%, more preferably at most 5%, most preferably at most 1% of the width of the narrowest of said two adjacent tapes. Preferably, the undirectionally aligned tapes forming the laminae are in an abutting relationship. In one embodiment, the tapes forming the laminae are undirectionally aligned and two adjacent tapes overlap each other along their length over part of their surface, preferably the overlapping part being at most 50%, more preferably at most 25%, most preferably at most 10% of the width of the narrowest of said two overlapping adjacent tapes.

In a more preferred embodiment, any one of the inventive materials comprises a laminate component comprising at least one laminae, said at least one laminae comprising a woven fabric of polymeric fibers. Preferably, the polymeric fibers are polymeric tapes. Preferred woven structures are plain weaves, basket weaves, satin weaves and crow-foot weaves. Most preferred woven structure is a plain weave. When using polymeric tapes, preferably the thickness of a woven laminae is between 1.5 times and 3 times the thickness of a tape, more preferably about 2 times the thickness of a tape.

The laminate component used in accordance with the invention may also comprise a binder or a matrix material, which may be impregnated between the polymeric fibers and/or throughout said laminate component. When the laminate component comprises a plurality of laminae, the laminae may also contain a binder or a matrix material. Usually, the binder or the matrix is used to hold the polymeric fibers together and/or to improve the mechanical properties of the laminate component. Specific binders and matrices may be used to influence the electromagnetic properties of said laminate component. Various binders or matrices may be used, examples thereof including thermosetting and thermoplastic materials. A wide variety of thermosetting materials are available, however, epoxy resins or polyester resins are most common. Suitable thermosetting and thermoplastic materials are enumerated in, for example, WO 91/12136 A1 (pages 15-21) included herein by reference. From the group of thermosetting materials, vinyl esters, unsaturated polyesters, epoxides or phenol resins are preferred. From the group of thermoplastic materials, polyurethanes, polyvinyls, polyacrylics, polybutyleneterephthalate (PBT), polyolefins or thermoplastic elastomeric block copolymers such as polyisopropene-polyethylene-butylene-polystyrene or polystyrene-polyisoprene-polystyrene block copolymers are preferred. In particular, isocianates when used as a matrix or a binder, proved to impart the inventive materials with good performances at high and ultra-high frequencies.

More preferred, however, is that the laminate component is substantially free of any binder or matrix material impregnated between the polymeric fibers and throughout the laminate component. It was observed that in the absence of binders or matrix materials, the electromagnetic properties of the materials of the invention may be improved.

Preferably, the laminate component used in accordance with the invention comprises a plurality of laminae, which are bonded together by means of heat and pressure. Preferably, sufficient heat and pressure are applied to bond said plurality of laminae together such that a rigid laminate component is obtained. Preferably, the laminate component used in accordance with the invention has a flexural strength of at least 50 MPa, more preferably of at least 70 MPa, even more preferably at least 90 MPa, most preferably of at least 110 MPa. Preferably, the flexural strength of said laminate component is between 70 and 200 MPa, more preferably between 90 and 150 MPa, most preferably between 110 and 120 MPa. Preferably, the flexural modulus of the laminate component is at least 10 GPa, more preferably at least 30 GPa, most preferably at least 50 GPa. It was observed that by using a rigid laminate component, the electromagnetic and the mechanical properties of the materials of the invention are improved.

Examples of polymeric fibers suitable for the present invention include but are not limited to fibers manufactured from polyamides and polyaramides, e.g. poly(p-phenyleneterephthalamide) (known as Kevlar®); poly(tetrafluoroethylene) (PTFE); poly{2,6-diimidazo-[4,5b-4',5'e]pyridinylene-1,4(2,5-dihydroxy)phenylene} (known as M5); poly (p-phenylene-2,6-benzobisoxazole) (PBO) (known as Zylon®); poly(hexamethyleneadipamide) (known as nylon 6,6), poly(4-aminobutyric acid) (known as nylon 6); polyesters, e.g. poly(ethylene terephthalate), poly(butyleneterephthalate), and poly(1,4 cyclohexylidenedimethyleneterephthalate); polyvinyl alcohols; thermotropic liquid crystal polymers (LCP) as known from e.g. U.S. Pat. No. 4,384,016; polyolefins e.g. homopolymers and copolymers of polyethylene and/or polypropylene; and combinations thereof.

Good results may be obtained when the polymeric fibers are polyolefin fibers, more preferably polyethylene fibers. Preferred polyethylene fibers are high and ultrahigh molecular weight polyethylene ([U]HMWPE) fibers. Polyethylene fibers may be manufactured by any technique known in the art, preferably by a melt or a gel spinning process. Most preferred fibers are gel spun UHMWPE fibers, e.g. those sold by DSM Dyneema, NL under the name Dyneema®. If a melt spinning process is used, the polyethylene starting material used for manufacturing thereof preferably has a weight-average molecular weight between 20,000 and 600,000 g/mol, more preferably between 60,000 and 200,000 g/mol. An example of a melt spinning process is disclosed in EP 1,350,868 incorporated herein by reference. If the gel spinning process is used to manufacture said fibers, preferably an UHMWPE is used with an intrinsic viscosity (IV) of preferably at least 3 dl/g, more preferably at least 4 dl/g, most preferably at least 5 dl/g. Preferably the IV is at most 40 dl/g, more preferably at most 25 dl/g, more preferably at most 15 dl/g. Preferably, the UHMWPE has less than 1 side chain per 100 C atoms, more preferably less than 1 side chain per 300 C atoms. Preferably the UHMWPE fibers are manufactured according to a gel spinning process as described in numerous publications, including EP 0205960 A, EP 0213208 A1, U.S. Pat. No. 4,413,110, GB 2042414 A, GB-A-2051667, EP 0200547 B1, EP 0472114 B1, WO 01/73173 A1, EP 1,699,954 and in "Advanced Fibre Spinning Technology", Ed. T. Nakajima, Woodhead Publ. Ltd (1994), ISBN 185573 182 7. To produce fibers having a tape-like shape, the above-cited processes may be routinely adapted by using spinning dyes having spinning slits instead of spinning holes.

The tensile strength of the polymeric fibers is preferably at least 1.2 GPa, more preferably at least 2.5 GPa, most preferably at least 3.5 GPa. The tensile modulus of the polymeric fibers is preferably at least 30 GPa, more preferably at least 50 GPa, most preferably at least 60 GPa. Best results were obtained when the polymeric fibers were UHMWPE fibers having a tensile strength of at least 2 GPa, more preferably at least 3 GPa and a tensile modulus of at least 40 GPa, more preferably of at least 60 GPa, most preferably at least 80 GPa.

In a special embodiment of the present invention, the polymeric fiber is a polymeric tape, the tape being preferably manufactured from polyolefin, more preferably from UHMWPE.

Preferably, the polymeric tapes used in accordance to the invention, are made by a solid-state process, i.e. a process comprising step a) feeding a polymeric powder bed between a combination of endless belts and compression-moulding the polymeric powder bed between pressuring means at a temperature below the melting point of the polymeric powder; step b) conveying the resultant compression-moulded polymeric powder between calendar rolls to form a tape; and step c) drawing the tape. Tapes made with the solid-state process are usually referred to as solid-state tapes. Preferably, the polymeric powder used in the manufacturing of solid-state tapes is a polyolefin powder, more preferably an UHMWPE powder. Preferably, the UHMWPE powder has an IV of preferably at least 3 dl/g, more preferably at least 4 dl/g, most preferably at least 5 dl/g. Preferably said IV is at most 40 dl/g, more preferably at most 25 dl/g, more preferably at most 15 dl/g. Using solid-state tapes and in particular UHMWPE solid-state tapes in the materials of the invention improved the electromagnetic properties of said materials and even allowed the manufacturing of materials with unique characteristics never achieved hitherto.

Drawing, preferably uniaxial drawing, of the produced solid-state tapes may be carried out by means known in the art. Such means comprise extrusion stretching and tensile stretching on suitable drawing units. To attain increased mechanical strength and stiffness, drawing may be carried out in multiple steps. In case of the preferred UHMWPE tapes, drawing is preferably carried out uniaxially in a number of drawing steps. The first drawing step may for instance comprise drawing to a stretch factor of 3. By multiple drawing at increasing temperatures, stretch factors of about 50 and more may be reached, whereby the process is run under such conditions, that no melting of the tape occurs e.g. a temperature below the melting temperature of the tape. This results in the high strength tapes, whereby at least for tapes of UHMWPE, strengths of 1.5 GPa and more may be obtained.

The tensile strength of the polymeric tapes and more in particular of the polyolefin tapes used in accordance with the invention is preferably at least 0.5 GPa, more preferably at least 1 GPa, most preferably at least 1.5 GPa. The tensile modulus of said polymeric tapes and more in particular of the polyolefin tapes is preferably at least 30 GPa, more preferably at least 50 GPa, most preferably at least 110 GPa. Good results may be obtained when the polyolefin tapes are UHMWPE tapes having a tensile strength of at least 1.3 GPa, more preferably at least 1.5 GPa and preferably a tensile modulus of at least 100 GPa, more preferably of at least 105 GPa, most preferably at least 110 GPa.

In a preferred embodiment, any one of the inventive materials comprises a laminate component, preferably a single laminate component, said laminate component comprising an upper surface and a lower surface opposite to the upper surface, wherein at least said upper surface, more preferably both said upper and lower surfaces, are coated with a polymeric coating. When the materials of the invention comprise a plurality of laminate components, preferably, said plurality of laminate components forms a stack of laminate components, said stack having an upper-stack surface and a lower-stack surface opposite to the upper-stack surface, wherein at least said upper-stack surface, more preferably both said upper- and lower-stack surfaces, are coated with a polymeric coating. The thickness of the polymeric coating is preferably at least 0.5 µm, more preferably at least 1 µm, most preferably at least 1.5 µm. The thickness of the polymeric coating is preferably at most 40 µm, more preferably at most 30 µm, most preferably at most 20 µm. The thickness of the polymeric coating is preferably between 1.5 and 40 µm, more preferably between 3 and 30 µm, most preferably between 5 and 20 µm.

It was surprisingly observed that the presence of the polymeric coating hardly affects the electromagnetic properties of the inventive materials and may offer increased design freedom. This may be the case even when the polymeric coating has a thickness different than quarter of the wavelength of the electromagnetic signal for which the inventive materials are to be used. The polymeric coating may provide further protection to the inventive materials against weather, impacts from wind carried debris and may also increase the service life of the inventive materials. The polymeric coating may also contain various fillers, pigments and additives such as fire retardant fillers and ultraviolet (UV) protective fillers. The amount of the various fillers, pigments and additives is preferably at most 60 wt % from the total mass of the polymeric coating, more preferably at most 50 wt %, most preferably at most 40 wt %.

Various polymeric materials may be used for the polymeric coating such as for example thermoplastic or thermosetting materials.

In one embodiment, the polymeric coating used in accordance with the invention comprises a thermoplastic material, examples of suitable thermoplastic materials including polyurethanes, cyanate esters, polyvinyls, polyacrylics, liquid crystal polymers (LCP), polybutyleneterephthalate (PBT), fluoroplastics, polyolefins, polyamides, polycarbonates or thermoplastic elastomeric block copolymers such as polyisopropene-polyethylene-butylene-polystyrene or polystyrene-polyisoprene-polystyrene block copolymers (e.g. Prinlin®). Other suitable thermoplastic materials are enumerated in, for example, WO 91/12136 A1 (pages 15-21) included herein by reference.

Most preferred thermoplastic materials used in the polymeric coating are polyvinyls and in particular polyvinyl fluorides, polyolefins and in particular low density polyethylene (LDPE) and high density polyethylene (HDPE), cyanate esters, polyether ether ketones (PEEK), liquid crystal polymers (LCP), acrylonitrile butadiene systems (ABS) and fluoroplastics, e.g. polytetrafluoroethylene (PTFE).

The polymeric coatings comprising a thermoplastic material may be applied on any one of the inventive materials according to known methods in the art. For example said polymeric coatings may be applied via a liquid polymeric coating composition, which is afterwards dried, or they may be applied as a freestanding coating film, which is for example laminated on one or both surfaces of the inventive materials.

Preferably, the polymeric coating comprising a thermoplastic material is applied as a freestanding coating film, which is laminated by heat and/or pressure on the inventive materials. In one embodiment, said freestanding coating film comprises a polyvinyl fluoride and preferably has a tensile modulus of between $10 \times 10^3$ and $1000 \times 10^3$ psi, more preferably of between $100 \times 10^3$ psi and $500 \times 10^3$ psi, most preferably between $250 \times 10^3$ psi and $400 \times 10^3$ psi. Preferred examples of freestanding coating films comprising a polyvinyl fluoride and having such suitable mechanical properties, include Tedlar® from DuPont. In another embodiment, said freestanding coating film comprises a HDPE and preferably has a tensile modulus of between $30 \times 10^3$ psi and $500 \times 10^3$ psi, more preferably of between $50 \times 10^3$ psi and $300 \times 10^3$ psi, most preferably between $70 \times 10^3$ psi and $200 \times 10^3$ psi. In yet another embodiment, said freestanding coating film comprises a LDPE.

In an alternative embodiment, the polymeric coating used in accordance with the invention comprises a thermosetting material, examples of suitable thermosetting materials including epoxy based resins, phenolic based resins and polyester based resins. Other suitable thermosetting materials are enumerated in, for example, WO 91/12136 A1 (pages 15-21) included herein by reference.

Suitable epoxy based resins, also referred to simply as epoxies, to be used in accordance with the invention are for example those comprising an epoxy monomer or an epoxy resin in amounts of from about 20% by weight to about 95% by weight, based on the total weight of the epoxy based resin, preferably from about 30% by weight to about 70% by weight. Preferably, the epoxy monomer or resin has a high crosslink density, e.g. a functionality of about 3 or greater, and an epoxy equivalent weight of less than 250. Examples of suitable epoxy resins include the EPON Resins from Shell Chemical Company, Houston, Tex., for example, EPON Resins 1001 F, 1002F, 1007F and 1009F, as well as the 2000 series powdered EPON Resins, for example, EPON Resins 2002, 2003, 2004 and 2005. Further examples of epoxies, which may be employed according to the invention, include The Dow Chemical Company (Midland, Mich.) epoxy novolac resins D.E.N. 431, D.E.N. 438 and D.E.N. 439. Exemplary waterborne epoxy resins which may be used in the present invention include the EPI-REZ Resins from Shell Chemical Company, for example, the EPI-REZ Resins WD-510, WD-511, WD-512, 3510-W-60, 3515-W-60, 3519-W-50, 3520-WY-55 and 3522-W-60. Further commercially available examples of epoxy resins used in the coating formulation include MIL-PRF-22750F; MIL-PRF-22750F; MIL-P-53022C Type II, E90Y203 (Type I, Class C2, 2.8 VOC); MIL-P-53022B, E90G204 (Type II, Class I); MIL-P-53022B; MIL-P-23377G, e.g. E90G203 (Type I, Class C2, 2.8 VOC); and MIL-P-53022. Other suitable epoxy resins may include liquid epoxy esters as proposed by C. K. Thorstad, "*Emulsions—Why and How They are Used*", Modern Plastics, July 1959, pp. 83-84, in compositions containing either water or the epoxy ester itself as a vehicle, together with polyvinylacetate, polyacrylic, or poly(butadiene/styrene) lattices. Acid curing agents, for example dimethyl acid pyrophosphate or boron trifluoride are cited for these applications. The epoxy based resin used according to the invention has preferably a dielectric constant of at most 6.0, more preferably of at most 3.0, most preferably of at most 2.2. Preferably said dielectric constant of said epoxy based resin is between 2.2 and 2.5, more preferably between 2.20 and 2.22. The dielectric constant and dielectric loss of the epoxy based resin can be routinely measured with an electromagnetic transmission line positioned into an electromagnetic noise free room using a coaxial probe. Preferably the dielectric loss of said epoxy based resin is at most 0.025, more preferably at most 0.0001. Preferably, said dielectric constant is between 0.0001 and 0.0005.

In case when the polymeric coating used in accordance with the invention comprises a thermosetting material and more in particular an epoxy based resin, preferably, the surface of the laminate component or of the stack of laminate components onto which the polymeric coating is to be disposed is primed before the disposal of said coating. It was observed that with priming, the electromagnetic properties of the inventive materials may be further improved.

Primers may be applied by e.g. spraying solutions containing one or two component thermosetting resins diluted to sprayable levels with suitable organic solvents. Preferably, said suitable organic solvent is chosen not to affect the polymeric materials contained by the laminate components. The primers may also be applied starting from emulsions of thermosetting resin, said emulsions preferably containing one or more emulsified liquid thermosetting resins, e.g. liquid epoxy resins, dispersed in an aqueous dispersing phase containing an alkali and acid stable non-ionic emulsifying agent and a water-dispersible binding colloid. For those applications where curing agents are also required, the curing agent is dissolved into the thermosetting resin, e.g. epoxy resin, prior to dispersion. Such emulsions are known for example from U.S. Pat. No. 2,872,427 included herein by reference. Other suitable primers such as aqueous epoxy resin dispersions containing preferably chromium trioxide and phosphoric acid are disclosed in U.S. Pat. No. 5,001,173 included herein by reference. In the article "*Guidelines to Formulation of Waterborne Epoxy Primers*", M. A. Jackson, Polymer Paint Colour Journal 180 (4270) (1990) at pages 608-621, included herein by reference, are described two component primer systems containing as one component an epoxy resin dispersion in water and solvent together with various corrosion inhibitors, and as the second component, a water reducible amine catalyst in water. In the article "*Waterborne Epoxy Dispersions Provide Compliant Alternatives*", R. Buehner et. al., Adhesives Age, December 1991, included herein by reference, are described waterborne liquid and solid epoxy resin dispersions cured with dicyandiamide and water soluble 2-methylimidazole catalyst for use as adhesives.

Good results may be obtained when the primer is a one-component aqueous adhesive primer, which contains little or no volatile organic compounds (VOCs). The most preferred aqueous adhesive primer is an aqueous, non-ionic solid epoxy resin dispersion, which contain as a distinct phase a solid epoxy curing agent, preferably in the substantial absence of any protective colloid. Examples of such primers are known from U.S. Pat. No. 5,576,061 the entire content of which is included herein by reference. Commercial examples of such primers include MIL-PRF-22750F; MIL-PRF-22750F; MIL-P-53022C Type II, E90Y203 (Type I, Class C2, 2.8 VOC); MIL-P-53022B, E90G204 (Type II, Class I); MIL-P-53022B; MIL-P-23377G, e.g. E90G203 (Type I, Class C2, 2.8 VOC); and MIL-P-53022.

The epoxy resins used in the formulation of an aqueous adhesive primer utilized in accordance with the invention are hereinafter simply referred to as epoxy primers. The epoxy primers are preferably conventional solid epoxy resins having functionalities of about 1.8 or more, preferably 2 or more, containing substantially no ionic or ester groups, as described in "*Epoxy Resins*", Lee and Neville, McGraw-Hill, chapters 1 to 4, included herein by reference. Preferred epoxy primers are the optionally chain-extended, solid glycidyl ethers of phenols such as resorcinol and the bisphenols, e.g. bisphenol A, bisphenol F, and the like. Also suitable are the solid glycidyl derivatives of aromatic amines and aminophenols, such as N,N,N',N'-tetraglycidyl-4,4'-diaminodiphenylmethane. Preferred are the solid novolac epoxy primers and solid DGEBA primers. The epoxy primers must be solids themselves, or produce solid compositions when admixed with other epoxies.

Examples of suitable commercial epoxy primers are Epi-Rez® SU-8, a polymeric epoxy resin with an average functionality of about 8, melting point (Durran's) of 82° C., and an epoxy equivalent weight of 215 available from Rhone-Poulenc; DER 669, a high molecular weight solid epoxy resin having a Durran's softening point of 135°-155° C. and an epoxy equivalent weight of 3500-5500 available from the Dow Chemical Company; Epi-Rez® 522-C, a solid DBEGA epoxy having an epoxy equivalent weight of 550-650 and a Durran's melting point of 75°-85° C., available from Rhone-Poulenc; and ECN 1273, 1280, and 1299 ortho-cresolformaldehyde novolac solid epoxy resins having epoxy functionalities of from 3.8 to 5.4, epoxy equivalent weights of from 225 to 235, and melting points of from 73°-99° C., available from Ciba-Geigy. These primers may be supplied in solid form and ground to the correct particle size, or as an aqueous dispersion. For example, ECN-1299 is available as an aqueous dispersion from Ciba-Geigy as ECN-1440, and Epi-Rez® 522C from Rhone-Poulenc as 35201 epoxy dispersion.

Preferably, the aqueous adhesive primers utilized in accordance with the invention comprises from 40 to about 10 percent by weight of a dispersed phased containing the epoxy primer, and from 60 to about 90 percent by weight of an aqueous phase. The epoxy primer dispersed phase may comprise a dispersion of more than one epoxy resin as a mixture of distinct particles, or may consist of only one type of particle containing more than one epoxy resin. Thus a flexibilizing epoxy such as the higher molecular weight bisphenol A or bisphenol F epoxies may be blended with a highly temperature resistant epoxy such as TGMDA and the mixture cooled, ground, or otherwise dispersed into solid particles of the requisite size. These same epoxy resins might be advantageously dispersed separately without blending.

As indicated above, mixtures of epoxy resins are also suitable as epoxy primers. A preferred mixture comprises a solid epoxy resin having a functionality of about 5.5 or less, and a solid epoxy resin having a functionality of about 6 or more. The use of higher functionality epoxy resins, i.e. epoxy resins having a functionality of five or more, in minor amounts is preferred, for examples less than 40 weight percent based on the sum of the weights of all epoxy resins in the composition. The use of such higher functionality epoxy resins in such minor amounts has been unexpectedly found to increase the solvent resistance of the cured primer without lowering adhesive properties substantially. A preferred high functionality epoxy resin is Epi-Rez® SU-8, a polymeric solid epoxy resin having an average functionality of eight.

Especially preferred is a mixture of:
1) from 30 to 70 weight percent of a solid epoxy resin having a functionality of from about 1.8 to about 4 and an epoxy equivalent weight of from about 400 to about 800;
2) from 5 to 20 weight percent of a solid epoxy resin having a functionality of from about 1.8 to about 4 and an epoxy equivalent weight of from about 2000 to about 8000; and
3) from 10 to 40 weight percent of a solid epoxy resin having a functionality of about 5 or more and having an epoxy equivalent weight of from about 100 to about 400, wherein the weight percents are totaling 100 percent based on total weight of the epoxy mixture.

Suitable curing agents for the epoxy primers used in accordance with the invention are preferably substantially water insoluble, and are preferably solid at room temperature. Examples of such curing agents are aromatic amine curing agents such as 4,4'-diaminodiphenylmethane, and in particular, 3,3'- and 4,4'-diaminodiphenylsulfone. Further suitable are 3,3'- and 4,4'-diaminodiphenyloxide, 3,3- and 4,4'-diaminodiphenyloxide, 3,3'- and 4,4'-diaminodiphenylsulfide, and 3,3'- and 4,4'-diaminodiphenylketone. Most preferred as a curing agent is 4,4'-[1,4-phenylene(1-methylethylidene)]-bis(benzeneamine). Also suitable are the amino and hydroxyl terminated polyarylene oligomers wherein the repeating phenyl groups are separated by ether, sulfide, carbonyl, sulfone, carbonate, or like groups. Examples of such curing agents are the amino- and hydroxyl-terminated polyarylenesulfones, polyaryleneethersulfones, polyetherketones, polyetheretherketones, and like variants.

Other suitable solid diamine curing agents include 2,4-toluenediamine, 1,4-phenylenediamine, 2,2-bis(4-aminophenyl)hexafluoropropane, 2,2-bis(3-amino-4-hydroxyphenyl)hexafluoropropane, 3,4'-diaminodiphenyloxide, 9,9-bis (4-aminophenyl)fluorene, o-toluidine sulfone, and 4,4'-diaminobenzanilide. Particularly also preferred are 9,10-bis(4-aminophenyl)anthracene, 2,2-bis(4-[3-aminophenoxy]phenyl)sulfone, 2,2-bis(4-[4-aminophenoxy]phenyl)sulfone, 1,4-bis(4-aminophenoxy)biphenyl, bis(4-[4-aminophenoxy)phenyl)ether, 2,2-bis(4-[4-aminophenoxy]phenyl)propane, and 2,2-bis([4-(4-amino-2-trifluorophenoxy)]phenyl)hexafluoropropane. Most preferably, those solid amine curing agents having melting points below 250° F., preferably below 220° F. are utilized.

Catalysts are generally unnecessary for the epoxy primers; however, solid, water dispersible catalysts may be added when the particular curing agent is not sufficiently active at the primer bake temperature to effectively cure the epoxy primer. The catalyst should be substantially water insoluble, and in particulate form having a particle size such that essentially 100 percent of the particles have mean diameters less than about 30 μm.

The presence of volatile organic solvents in the epoxy primers used in accordance with the invention is undesirable and generally unnecessary. However, it would not depart from the spirit of the invention to employ a portion of such a solvent, preferably a minor portion thereof, i.e. less than 1-2% by weight. Examples of volatile organic solvents, which could be added without affecting the function and physical properties of the composition, include the low molecular weight glycols and glycol ethers, N-methylpyrrolidone, and similar solvents. By the term "substantially solvent free" is meant that the system contains no volatile organic solvent or such a minor portion that substantially no advantage or difference can be ascertained between the cured physical properties obtained from the completely solvent-less system and the system containing the minor amount of solvent.

The epoxy primer may also contain dyes, pigments, leveling agents, additional dispersing agents, thickeners, and the like, however it is preferred that the epoxy primer is free of these compounds.

The one-component aqueous adhesive primer may be applied by traditional methods, for example by air driven or airless spray guns, by high volume low pressure spray guns, and the like, for example a Binks model 66 spray gun. Following drying, the finish is baked at a temperatures sufficient to the cure the coating, most preferably at about 115°-125° C. Cure time is dependent upon cure temperature and can be, for example from about 0.5 to about 4 hours. Preferably, the epoxy primer is cured at about 120° C. for one hour.

Nominal cured thicknesses for the primer used in accordance with the invention are from 0.02 to 1.0 mils (0.5 to 25.4 μm), preferably from 0.05 to 0.5 mils (1.3 to 12.7 μm), and especially from 0.05 to 0.25 mils (1.3 to 6.4 μm). Surprisingly, even though the primer and curing agent are in distinct phases, the coatings produced are of exceptionally high quality.

Once the primer, e.g. an epoxy primer, has been applied to the laminate component or to the stack of laminate components contained by the materials of the invention, the polymeric coating containing the thermosetting material, e.g. the epoxy based resin, can be adhered to the so-primed laminate component in a normal manner, e.g. by applying a cross-linkable epoxy based resin onto the primed surface of said laminate component, then curing the cross-linkable epoxy based resin.

In an embodiment of the invention, the epoxy resin contained by the coating formulation and the epoxy resin contained by the primer are the same.

The polymeric coating containing a thermoplastic or a thermosetting material may further comprise microparticles, microfibers, foaming and/or pore-forming agents, and may be dried, cured, and/or hardened so as to produce sufficient surface roughness to provide high contact angles to water. However, it is preferred that the polymeric coating used in the present invention is free of such components.

Preferably, the thickness of any one of the inventive materials (including the coating if present) is at least 0.1 mm, more preferably at least 0.3 mm, most preferably at least 0.5 mm. It was observed that even for such small thicknesses, the inventive materials may have good structural properties. The maximum thickness of the inventive materials is only limited by the application for which they are intended. For example in case of large structures, materials having thicknesses of up to 300 mm may be used. It was observed that for such large thicknesses, the materials of the invention may have good mechanical properties combined with good electromagnetic properties.

In one embodiment, the thickness of any one of the inventive materials when used to manufacture radomes for high-frequency antennas operating at frequencies higher than 1 GHz, preferably operating at frequencies within the frequency range of between 1 GHz and 130 GHz, is preferably between 100 μm and 300 mm, more preferably between 200 μm and 200 mm, most preferably between 300 μm and 100 mm. It was observed that radomes for high-frequency antennas and manufactured from any one of the materials of the invention having a thickness within the above ranges may perform exceedingly well. In particular said radomes' electromagnetic properties are very good and more in particular said radomes' loss tangents are very low.

It is not essential for the invention that the thickness of the materials of the invention is substantially the same at every location thereon. It is preferred that the thickness of said materials is substantially constant at least at the location or locations where the electromagnetic signal interacts with said materials. However, for ease of manufacturing it is preferred that the thickness of the inventive materials when measured at various locations on said materials is about the same.

It was observed that the inventive materials have unique electromagnetic properties and may offer a higher freedom to designing various radome constructions, freedom seldom, if ever, offered by the known materials hitherto. Especially for ultra-high frequencies, e.g. frequencies of above 50 GHz and even above 70 GHz, the inventive materials offer a unique performance. In particular at ultra-high frequencies, the materials of the invention show significantly reduced multi reflections or resonances as compared with known materials, which otherwise would amplify any signal noise to the extent that the operation of an antenna protected thereby may be seriously impaired. It was observed that the signal to noise ratio for the inventive materials when used in radomes is good which increases the efficiency of a radome-antenna system.

The invention also relates to a radome wall comprising any one of the inventive materials.

The invention relates further to radomes comprising any one of the inventive materials. It was observed that the inventive materials are suitable for use in radomes designed for a variety of applications.

In particular the invention relates to a radome comprising a geodesic structure, said structure comprising any one of the inventive materials. A radome comprising a geodesic structure is known for example from U.S. Pat. No. 4,946,736 (see FIG. 2 therein and description thereof) the disclosure of which is incorporated herein by reference. Other common designs of geodesic structures may include an "Igloo" shaped structure. It was observed that the inventive materials have sufficient mechanical properties to enable the manufacturing of such radomes.

The invention also relates to an aircraft comprising a radome, said radome containing any one of the inventive materials. It was observed that the inventive materials have properties making them useful as structural components in an aircraft. For example, the inventive materials can be used to form an aperture seal for an opening in a fuselage skin of the aircraft, wherein an antenna is located within said opening. A similar radome configuration is exemplified in U.S. Pat. No. 4,677,443 the disclosure of which is herein included by reference.

The invention also relates to an electromagnetic window comprising any one of the inventive materials. Electromagnetic windows are used as structural components in airborne, land and sea applications, and it was observed that the electromagnetic windows of the invention have good structural properties. For example, the inventive materials can be used to form an aperture seal for an opening in a part of a boat or a land base vehicle.

The invention also relates to a radome containing any one of the inventive materials wherein the radome is adapted for an array antenna, e.g. a phased array antenna. A design of a radome adapted for an array antenna is disclosed in U.S. Pat. No. 4,783,666 included herein by reference and more in particular in the Figures and figures' explanations thereof. A further design of such a radome is disclosed in U.S. Pat. No. 5,182,155 included herein by reference. It was observed that for such an array antenna the inventive materials enable the manufacturing of a radome having good electromagnetic as well as mechanical properties.

The invention further relates to a radome containing a spherical structure or a part of a spherical structure, said structure containing at least one spherical element, preferably containing a plurality of partly spherical elements, said at least one element comprising any one of the inventive materials. A method for constructing such a structure is described in U.S. Pat. No. 5,059,972, the disclosure of which being included herein by reference. It was observed that the inventive materials enable the construction of spherical radomes suitable for enclosing large antennas in particular those used for monitoring atmospherical disturbances.

The invention further relates to a radome for protection from atmospheric influences said radome comprising a folding rigid structure said structure comprising any one of the inventive materials wherein the radome preferably further comprises a flexible roofing. Such a radome construction is known for example from U.S. Pat. No. 4,833,837 included herein by reference.

The invention also provides a radome adapted to cover a radar antenna for an aircraft, ship or other radar installation, said radome comprising any one of the inventive materials.

The invention further relates to a radome-antenna system comprising a radome containing any one of the inventive materials and an antenna device. Preferably, the antenna device is chosen from the group consisting of an antenna array; a microwave antenna; a dual or multiple frequency antenna preferably operating at frequencies above 39.5 GHz; a radar antenna; a planar antenna; and a broadcast antenna.

By antenna is understood in the present invention a device capable of emitting, radiating, transmitting and/or receiving electromagnetic radiation. Examples of typical antennas include air surveillance radar antennas and satellite communication station antennas.

The invention also relates to a method of transmitting and/or receiving electromagnetic waves, wherein any one of the inventive materials is placed in the path of said electromagnetic waves, for example as a radome. For example a protective structure comprising any one of the inventive materials is utilized to house and/or protect lasers, masers, diodes and other electromagnetic wave generation and/or receiving devices. In one particular embodiment, a protective structure as herein described is utilized in conjunction with devices operating with radio frequency waves such as those between about 1 GHz and 130 GHz, preferably between about 1 GHz and 100 GHz, more preferably between 1 GHz and 72 GHz. Protective structures could be useful for protecting electrical equipment used to monitor parts of a human or animal body or organs thereof, to monitor weather patterns, to monitor air or ground traffic or to detect the presence of aircraft, boats or other vehicles around e.g. military facilities including warships.

The invention further relates to a process for manufacturing a material, in particular a material having good electromagnetic properties such as the inventive materials, said process comprising the steps of:

a) providing at least one laminae comprising polymeric fibers;
b) providing at least one pre-formed polymeric film;
c) stacking the at least one laminae to obtain a laminae-stack having an upper surface and a lower surface, which is opposite to the upper surface, and placing the at least one pre-formed polymeric film at least on the upper surface to create an assembly containing said laminae-stack and said pre-formed polymeric film;
d) compressing the assembly of step c) at a pressure of at least 50 bars and at a temperature of less than the melting temperature of the polymeric fibers, for a dwell time;
e) cooling the assembly to below 70° C., preferably to room temperature, followed by releasing the pressure; and
f) optionally removing the pre-formed polymeric film from the assembly.

Preferably at step a) of the process of the invention, a plurality of laminae is used. Preferably, said plurality of laminae comprises a number of at least two laminae, more preferably of at least four laminae, wherein preferably an even number of laminae is used. The number of laminae may be chosen to obtain an inventive material having the desired thickness or areal density. The skilled person can routinely determine the number of laminae to yield the desired thickness or areal density of any one of the inventive materials.

Preferably, the laminae used in the process of the invention are the laminae of the embodiments detailed in the paragraphs hereinabove and used in accordance with the invention.

Any one of the polymeric fibers mentioned hereinabove is suitably used in the process of the invention. Preferably, tapes are used in the process of the invention, more preferably polyethylene tapes, most preferably UHMWPE tapes.

According to step b) of the process of the invention, at least one pre-formed polymeric film is provided. Pre-formed polymeric films manufactured from various polymeric materials can be used according to the process of the invention. In one embodiment, said pre-formed polymeric film is manufactured from a polymeric material that is different, e.g. it belongs to a different polymeric class, than the polymeric material used to manufacture the polymeric fibers contained by the laminae as this may ease the removal of the pre-formed polymeric film.

Preferred polymeric materials for manufacturing the pre-formed polymeric films used in accordance to the process of the invention include polyvinyl-based materials, e.g. polyvinyl chloride, and silicone-based materials. These pre-formed polymeric films proved particularly suitable when polyolefin fibers and in particular UHMWPE fibers or UHMWPE tapes were used in the manufacturing of any one of the inventive materials.

Good results may be obtained when the pre-formed polymeric films are films manufactured from polyvinyl chloride or silicon rubber.

By pre-formed polymeric film is herein understood a film manufactured from a polymeric material, wherein said film is freestanding, e.g. a sample of said film of e.g. 50 cm×50 cm does not break under its own weight when suspended at a height of double its highest dimension.

The thickness of the pre-formed polymeric film is preferably at least 50 µm, more preferably at least 100 µm, most preferably at least 150 µm. Preferably, the thickness of the pre-formed polymeric film is between 100 µm and 25 mm, more preferably between 200 µm and 20 mm, most preferably between 300 µm and 15 mm. For example, for silicon rubber films most preferred thicknesses are between 500 µm and 15 mm, while for polyvinyl chloride films most preferred thickness are between 1 mm and 10 mm. Silicon rubber and polyvinyl chloride films having a wide range of thicknesses are commercially available and may be obtained e.g. from Arlon (US) and WIN Plastic Extrusion (US), respectively.

It was observed that good results may be obtained when the pre-formed polymeric film has a tensile strength of at least 3 MPa. Preferably, the tensile strength of the pre-formed polymeric film is at least 9 MPa, more preferably at least 15 MPa, even more preferably at least 19 MPa. In case a polyvinyl chloride film is used as the pre-formed polymeric film, said polyvinyl chloride film preferably has a tensile strength of between 10 MPa and 25 MPa, more preferably of between 13 MPa and 22 MPa, most preferably of between 16 MPa and 20 MPa. In case a silicon rubber film is used as the pre-formed polymeric film, said silicon rubber film preferably has a tensile strength of between 3 MPa and 20 MPa, more preferably of between 5 MPa and 17 MPa, most preferably of between 7 MPa and 15 MPa.

Preferably, the pre-formed polymeric film has an elongation at break of at least 100%, more preferably at least 250%, even more preferably at least 350%, most preferably at least 600%. In case a polyvinyl chloride film is used as the pre-formed polymeric film, said polyvinyl chloride film preferably has an elongation at break of between 100% and 500%, more preferably of between 150% and 450%, most preferably of between 200% and 400%. In case a silicon rubber film is used as the pre-formed polymeric film, said silicon rubber film preferably has an elongation at break of between 300% and 900%, more preferably of between 400% and 800%, most preferably of between 500% and 700%.

Good results may be obtained when the pre-formed polymeric film has a tensile modulus of at least 3 MPa, more preferably at least 6 MPa, even more preferably at least 9 GPa. Preferably, the tensile modulus of the pre-formed polymeric film is at most 100 MPa, more preferably at most 75 MPa, most preferably at most 50 MPa. In case a polyvinyl chloride film is used as the pre-formed polymeric film, said polyvinyl chloride film preferably has a tensile modulus of between 3 MPa and 25 MPa, more preferably of between 5 MPa and 20 MPa, most preferably of between 7 MPa and 15 MPa. In case a silicon rubber film is used as the pre-formed polymeric film, said silicon rubber film preferably has a tensile modulus of between 1 MPa and 20 MPa, more preferably of between 2 MPa and 15 MPa, most preferably of between 3 MPa and 10 MPa.

Pre-formed polymeric films manufactured from the above mentioned materials and having the above mentioned properties are commercially available. Moreover, the skilled person can easily produce such films with techniques commonly known in the art, e.g. extrusion, extrusion-moulding, solid-state compression or film-blowing, and stretch these films unidirectionally or bidirectionally to such an extent to obtain the required mechanical properties.

According to step c) of the process of the invention, the at least one laminae is stacked to obtain a laminae-stack having an upper-stack surface and a lower-stack surface which is opposite to the upper-stack surface. The stacking of the laminae is preferably carried out such that the laminae overlap over a major part of their surface, e.g. over more than 80% of their surface, preferably such that the laminae overlap substantially over their entire surface. At least one pre-formed polymeric film is then placed at least on the upper-stack surface to create an assembly containing said laminae-stack and said pre-formed polymeric film. Preferably, the lateral dimensions of width and length of the pre-formed polymeric film are chosen to at least match the lateral dimensions of the stack such that said pre-formed polymeric film covers the upper-stack surface substantially in its entirety. It goes without saying that although called upper-stack surface and lower-stack surface, these denominations are not limiting and they are interchangeable. Better results may be obtained when a pre-formed polymeric film is placed on both the upper-stack surface and on the lower-stack surface.

Preferably, at step c) of the process of the invention, a sheet of cellulosic material is also placed on the pre-formed polymeric film. Preferably, two sheets of cellulosic materials are used, one being placed on the pre-formed polymeric film and one being placed on the surface of the laminae-stack which is opposite to the surface of said stack covered by the pre-formed polymeric film; and in case two pre-formed polymeric films are used, one on the upper-stack surface and one on the lower-stack surface, preferably, a sheet of cellulosic material is placed on both said pre-formed polymeric films, said sheets of cellulosic material facing towards outside the assembly laminae stack/pre-formed polymeric film. Any cellulosic material may be used in the process of the invention, preferably said cellulosic material is derived from wood or rags. The sheet of cellulosic material may also contains additives or reinforcing materials such as succinic acid (dihydro-2,5-furandione), polyvinylalcohol, hydroxyethylcellulose, carboxymethylcellulose, rosin, acrylic co-polymers, hydrocolloids, clay, latex and starch. The amounts of additives or reinforcing materials may vary widely. For example, increasing the concentration of reinforcing materials, a stronger sheet of cellulosic material is obtained. The thickness of the sheet of cellulosic material is preferably between 100 µm and 1 mm, more preferably between 175 µm and 800 µm, most preferably between 250 µm and 500 µm. Examples of sheets of cellulosic materials include technical papers, packaging papers, release liners, cigarette paper, kraft paper, alkaline paper, machine finished papers, machine glazed papers and other industrial papers. Most preferred is kraft paper. Such papers are known in the art and are commercially available in a wide range of different thicknesses. It was observed that good results may be obtained by using such cellulosic sheets and in some cases, the pre-formed polymeric film can be dispensed with.

The assembly of step c) of the process of the invention is compressed at step d) with a pressure of at least 50 bars, preferably of at least 100 bars, most preferably of at least 150 bars. Any conventional pressing means may be utilized in the process of the invention e.g. a WN Anlagepress. It was observed that good results may be obtained if a double belt press is used. Double belt presses are known in the art and are manufactured for example by Hymmen (DE).

To compress an assembly as the one used in the present invention, e.g. an assembly containing a stack of two or more laminae, said assembly is generally placed in an open mould. The open mould may also have a female part and a male part. The assembly may also be clamped to one part of the mould, generally to the female part. To obtain a flat compressed assembly, both the male and the female parts of the mould should be planar; whereas to obtain a three dimensionally shaped compressed assembly, said male and female parts may contain curvatures or other shaped geometries in one or more directions. After placing the assembly in the mould, the mould is closed and pressure is applied on said assembly. In order to compress the assembly under temperature, the mould can be heated.

The temperature during compression is generally controlled through the mould temperature and can be measured with e.g. thermocouples placed between the laminae. The temperature during the compression step is preferably chosen below the melting temperature ($T_m$) of the polymeric fibers as measured by DSC. In case the assembly contains more than one type of polymeric fibers, by melting temperature is herein understood the lowest melting temperature of the more than one type of polymeric fibers.

Preferably the temperature during the compression step d) is at most 20° C., more preferably at most 10° C. and most preferably at most 5° C. below the melting temperature of the polymeric fibers. For example, in the case of polyethylene fibers or tapes and more in particular in case of UHMWPE fibers or tapes, a temperature for compression of preferably between 135° C. and 150° C., more preferably between 145° C. and 150° C. may be chosen. The minimum temperature generally is chosen such that a reasonable speed of consolidation is obtained. In this respect 50° C. is a suitable lower temperature limit, preferably this lower limit is at least 75° C., more preferably at least 95° C., most preferably at least 115° C.

After compressing the assembly, the assembly is cooled under pressure to preferably the room temperature, after which the pressure is released. The pre-formed polymeric film may be removed, to the extent it is possible, from the assembly and a compressed laminae-stack having suitable electromagnetic properties is obtained. The compressed laminae-stack may also be referred herein as a laminate component. In case sheets of cellulosic material are used in the process of the invention, these sheets are to be removed also.

In a preferred embodiment of the process of the invention, the polymeric fibers used at step a) are polyethylene fibers or tapes, more preferably UHMWPE fibers or tapes, most preferably UHMWPE tapes, and moreover at step c) a coating film comprising an olefinic polymer, preferably LDPE, more preferably HDPE is placed on at least the upper-stack surface, more preferably on both the upper- and lower-stack surfaces between the respective stack surface and the pre-formed polymeric film. Preferably, at least one sheet of cellulosic material is used as detailed hereinabove, more preferably two sheets of cellulosic material are used.

Preferably, the HDPE coating film used according to this embodiment has a tensile strength of at least 5 MPa, more preferably of at least 25 MPa, more preferably of at least 45 MPa.

In a further preferred embodiment of the process of the invention, the polymeric fibers used at step a) are polyethylene fibers or tapes, more preferably UHMWPE fibers or tapes, most preferably solid-state UHMWPE tapes. The process of this embodiment also comprises a further step g) where a coating film comprising a thermosetting polymer is deposited on at least one surface, more preferably on both surfaces of the compressed assembly obtained at step f).

The invention also relates to a compressed laminae-stack obtained with the process of the invention. Among the unique properties of the inventive materials and of the compressed laminae-stack of the invention one may identify:

i. Unique electromagnetic properties at 72 GHz. All known materials have too much electromagnetic loss which impedes their utilization in applications using such ultra-high frequencies.
ii. Presenting multiple reflections and/or resonance effects to a lesser extent than known materials. In stark contrast with known materials, which introduce electromagnetic noise and other unwanted signals, the compressed laminae-stack of the invention does not show these effects or shows them to a lesser extent.
iii. Low variation of dielectric loss across a broad frequency range e.g. from 1 GHz to 140 GHz.
iv. Minimum dissipative loss and reflective loss Therefore, the compressed laminae-stack of the invention is suitable at least for use in radome applications, mobile masts and communication base stations.

In addition to their unique electromagnetic properties the materials and the compressed laminae-stack of the invention show very good ballistic performance, i.e. resistance against impacts from projectiles such as bullets, shrapnel, fragments and the like.

Methods of Measuring

Flexural strength and modulus of a laminate component is measured according to ASTM D790-07. To adapt for various thicknesses of the laminate component, measurements are performed according to paragraph 7.3 of ASTM D790-07 by adopting a loading and a support nose radius, which are twice the thickness of the laminate component and a span-to-depth ratio of 32.

Tensile properties of fibers, e.g. tensile strength and tensile modulus, were determined on multifilament yarns as specified in ASTM D885M, using a nominal gauge length of the fibre of 500 mm, a crosshead speed of 50%/min and Instron 2714 clamps, of type Fibre Grip D5618C. For calculation of the strength, the tensile forces measured are divided by the titre, as determined by weighing 10 meters of fibre; values in GPa for are calculated assuming the natural density of the polymer, e.g. for UHMWPE is 0.97 g/cm3.

The tensile properties, e.g. tensile strength and tensile modulus, of tapes and films, including the tensile strength, the tensile modulus and the elongation at break of pre-formed polymeric films are defined and determined as specified in ASTM D882 at 25° C., on tapes (if applicable obtained from films by slitting the films with a knife) of a width of 2 mm, using a nominal gauge length of the tape of 440 mm and a crosshead speed of 50 mm/min. If the tapes were obtained from slitting films, the properties of the tapes were considered to be the same as the properties of the films from which the tapes were obtained.

The thickness of a polymeric coating may be measured according to well-known techniques in the art, e.g. on a cross-section of the coated material with a microscope, e.g. scanning electron microscope.

The thickness of any one of the inventive materials (including the coating if present) may be measured with a micrometer on an original location and on eight peripheral locations, said peripheral locations being within a radius of at most 0.5 cm from the original location, and averaging the values.

The thickness of a pre-formed polymeric film may be measured with a micrometer.

The melting temperature (also referred to as melting point) of a polymeric powder is measured according to ASTM D3418-97 by DSC with a heating rate of 20° C./min, falling in the melting range and showing the highest melting rate.

The melting temperature (also referred to as melting point) of a polymeric fiber or tape, e.g. a polyolefin fiber or tape, is determined by DSC on a power-compensation PerkinElmer DSC-7 instrument which is calibrated with indium and tin with a heating rate of 10° C./min. For calibration (two point temperature calibration) of the DSC-7 instrument about 5 mg of indium and about 5 mg of tin are used, both weighed in at least two decimal places. Indium is used for both temperature and heat flow calibration; tin is used for temperature calibration only.

The furnace block of the DSC-7 is cooled with water, with a temperature of 4° C. This is done to provide a constant block temperature, resulting in more stable baselines and better sample temperature stability. The temperature of the furnace block should be stable for at least one hour before the start of the first analysis.

The sample is taken such that a representative cross-sectional of adjoining peripheral fiber surfaces of adjacent fibers is achieved which may suitable be seen through light microscopy. The sample is cut into small pieces of 5 mm maximum width and length to achieve a sample weight of at least about 1 mg (+/−0.1 mg).

The sample is put into an aluminum DSC sample pan (50 µl), which is covered with an aluminum lid (round side up) and then sealed. In the sample pan (or in the lid) a small hole must be perforated to avoid pressure build-up (leading to pan deformation and therefore worse thermal contact).

This sample pan is placed in a calibrated DSC-7 instrument. In the reference furnace an empty sample pan (covered with lid and sealed) is placed.

The following temperature program is run:
5 min. 40° C. (stabilization period)
40 up to 200° C. with 10° C./min. (first heating curve)
5 min. 200° C.
200 down to 40° C. (cooling curve)
5 min. 40° C.
40 up to 200° C. with 10° C./min. (second heating curve)

The same temperature program is run with an empty pan in the sample side of the DSC furnace (empty pan measurement).

Analysis of the first heating curve is used. The empty pan measurement is subtracted from the sample curve to correct for baseline curvature. Correction of the slope of the sample curve is performed by aligning the baseline at the flat part before and after the peaks (e.g. at 60 and 190° C. for UHMWPE). The peak height is the distance from the baseline to the top of the peak. For example in the case of UHMWPE, two endothermic peaks are expected for the first heating curve, in which case the peak heights of the two peaks are measured and the ratio of the peak heights determined.

For the calculation of the enthalpy of an endothermic peak transition prior to the main melting peak, the follwing procedure may be used. It is assumed that the endothermic effect is superimposed on the main melting peak. The sigmoidal baseline is chosen to follow the curve of the main melting peak, the baseline is calculated by the PerkinElmer Pyris™ software by drawing tangents from the left and right limits of the peak transition. The calculated enthalpy is the peak area between the small endothermic peak transition and the sigmoidal baseline. To correlate the enthalpy to a weight %, a calibration curve may be used.

Intrinsic Viscosity (IV) for polyethylene is determined according to method PTC-179 (Hercules Inc. Rev. Apr. 29, 1982) at 135° C. in decalin, the dissolution time being 16 hours, with DBPC as anti-oxidant in an amount of 2 g/l solution, by extrapolating the viscosity as measured at different concentrations to zero concentration.

Side chains in a polyethylene or UHMWPE sample is determined by FTIR on a 2 mm thick compression molded film by quantifying the absorption at 1375 $cm^{-1}$ using a calibration curve based on NMR measurements (as in e.g. EP 0 269 151)

Tensile modulus of polymeric coatings for free-standing polymeric films was measured according to ASTM D-638(84) at 25° C. and about 50% RH.

Tensile strength of polymeric coatings for free-standing polymeric films was measured according to ASTM D882-10 at 23° C. and about 50% RH.

The electromagnetic properties, e.g. dielectric constant and dielectric loss, were determined for frequencies of between 1 GHz and 20 GHz with the well-known Split Post Dielectric Resonator (SPDR) technique. For frequencies of above 20 GHz, e.g. of between 20 GHz and 144 GHz, the Open Resonator (OR) technique was used to determine said electromagnetic properties, wherein a classical Fabry-Perot resonator setup having a concave mirror and a plane mirror was utilized. For both techniques plane samples were used, i.e. samples not having any curvature in the plane defined by their width and length. In the case of SPDR technique, the thickness of the sample was chosen as large as possible being limited only by the setup design, i.e. the maximum height of the resonator. For the OR technique, the thickness of the sample was chosen to be an integer of about $\lambda/2$, wherein $\lambda$ is the wavelength at which the measurement is carried out. Since in the case of the SPDR technique, for each frequency at which the dielectric properties are measured a separate setup has to be utilized, the SPDR technique was carried out at the frequencies of 1.8 GHz; 3.9 GHz and 10 GHz. The setups corresponding to these frequencies are commercially available and were acquired from QWED (Poland) but are also sold by Agilent. The software delivered with these setups was used to compute the electromagnetic properties. For the OR technique, the setup was built in accordance with the instructions given in Chapter 7.1.17 of "*A Guide to characterization of dielectric materials at RF and Microwave frequencies*" by Clarke, R N, Gregory, A P, Cannell, D, Patrick, M, Wylie, S, Youngs, I, Hill, G, Institute of Measurement and Control/National Physical Laboratory, 2003, ISBN: 0904457389, and all the references cited in that chapter, i.e. references 1-6, and in particular reference [3] R N Clarke and C B Rosenberg, "*Fabry-Perot and Open-resonators at Microwave and Millimetre-Wave Frequencies, 2-300 GHz*", J. Phys. E: Sci. Instrum., 15, pp 9-24, 1982.

The coefficient of variation of the loss tangent in a frequency interval is calculated by measuring at least 3, preferably at least 5, values of the loss tangent in the frequency interval, computing from these values the average loss tangent and the standard deviation of the loss tangent, and dividing said standard deviation to said average. The coefficient of variation is expressed in %.

Production of UHMWPE Tapes

In one embodiment, an ultrahigh molecular weight polyethylene with an intrinsic viscosity of 20 dl/g was mixed to become a 7 wt % suspension with decalin. The suspension was fed to an extruder and mixed at a temperature of 170° C. to produce a homogeneous gel. The gel was then fed through a slot die with a width of 600 mm and a thickness of 800 μm. After being extruded through the slot die, the gel was quenched in a water bath, thus creating a gel-tape. The gel tape was stretched by a factor of 3.8 after which the tape was dried in an oven consisting of two parts at 50° C. and 80° C. until the amount of decalin was below 1%. This dry gel tape was subsequently stretched in an oven at 140° C., with a stretching ratio of 5.8, followed by a second stretching step at an oven temperature of 150° C. to achieve a final thickness of 18 micrometer. The width of the tapes was 0.1 m and their tensile strength 440 MPa. For the purpose of the invention, the tapes manufactured in accordance with this embodiment will be referred to herein as gel-spun tapes.

In another embodiment a tape was manufactured by pressing a UHMWPE polymeric powder having an average molecular weight $M_w$ of between 4 and 5 millions, IV of about 26 dl/g into a 0.2 mm thick tape. The pressing was carried out in a double belt press at a temperature of 125° C. and a pressure of about 0.02 GPa. The 0.2 mm thick tape was rolled by passing it through a pair of counter-rotating rollers having 100 mm in diameter and different peripheral speeds at 130° C. thereby forming a tape drawn 6 fold. The drawn tape was further drawn about 5 times into an oven at about 145° C. The resultant tape had a thickness of about 15 μm, a tensile strength of about 1.7 GPa, a tensile modulus of about 115 GPa and a width of about 80 mm. The process of this embodiment was similar with the process of EP 1 627 719 included herein by reference. For the purpose of the invention, the tapes manufactured in accordance with this embodiment will be referred to herein as solid-state tapes.

EXAMPLES 1-4

Solid-state UHMWPE tapes were woven into a plain woven laminae and a plurality of laminae were stacked to produce a stack of laminae. Four stacks were produced having a number of 5, 10, 16 and 23 laminae per stack, respectively. A single kraft paper sheet was placed on one surface of each of the stacks. On the other surface of each of the stacks a pre-formed polymeric film of polyvinyl chloride (PVC) sold by WIN Plastic Extrusion under the product code "Standard PVC film" was placed. The PVC film had a thickness of about 1000 μm, a tensile strength of about 16 MPa, an elongation at break of about 350% and a tensile modulus of about 9.6 MPa. Each assembly was pressed in hydraulic press at a temperature of 146° C. with a pressure of about 160 bars for a dwell time of about 35 minutes.

After the dwell time the assembly was cooled to room temperature while keeping the pressure on. After releasing the pressure the PVC film and the kraft paper were removed. The electromagnetic properties of the compressed stacks are presented in Table 1.

TABLE 1

| Thick- | Dielectric loss (radians) × $e^{-5}$ for specific frequencies | | | | | | | |
|---|---|---|---|---|---|---|---|---|
| ness (mm) | 1.8 GHz | 3.9 GHz | 10 GHz | 39.5 GHz | 72 GHz | AVER- AGE | ST. DEV. | CV % |
| EX. 1  0.9 | | | 14 | | | 12.2 | 4.76 | 39.05 |
| EX. 2  1.7 | | 18 | | | | | | |
| EX. 3  2.7 | | | | 5 | 11 | | | |
| EX. 4  4.0 | 13 | | | | | | | |

EXAMPLES 5-8

The process of Example 1 was repeated with the difference that a commercially available coating of a HDPE was placed in the form of a freestanding film between the PVC pre-formed film and the stack of laminae. The HDPE film had a thickness of 200 μm, a tensile strength of 57 MPa, a tensile modulus of 896 MPa and an elongation at break of 400%. The electromagnetic properties of the compressed stacks including the HDPE coating coated on both sides with an HDPE film are presented in Table 2.

TABLE 2

| Thick- | Dielectric loss (radians) × $e^{-5}$ for specific frequencies | | | | | | | |
|---|---|---|---|---|---|---|---|---|
| ness (mm) | 1.8 GHz | 3.9 GHz | 10 GHz | 39.5 GHz | 72 GHz | AVER- AGE | ST. DEV. | CV % |
| EX. 5  1.0 | | | | | | 11.5 | 5.68 | 49.45 |
| EX. 6  1.8 | | 18 | | | | | | |
| EX. 7  2.8 | | | | 5 | 9 | | | |
| EX. 8  4.1 | 14 | | | | | | | |

EXAMPLE 9-12

One surface of the materials produced in Examples 2-4 was primed by spraying with MIL-P-53022C, Type II to yield a 2.0-4.0 μm wet primer layer which was subsequently dried hard for 30 minutes under 77° F., 50% humidity conditions. The primed dried layer had a thickness of about 1.0-2.0 μm. The primed surface was then cleaned from contamination and coated by spraying with MIL-PRF-22750 Topcoat, Color #17925 Insignia White or RAL 9016 to yield a 2.8-3.1 μm wet coating layer which was subsequently dried hard for 8 hours under 77° F., 50% humidity conditions. The coating dried layer had a thickness of about 1.8-2.0 μm and was cured for 7 days under the same conditions during coating. The results are presented in Table 3.

TABLE 3

| | Thick-ness (mm) | Dielectric loss (radians) × e$^{-5}$ for specific frequencies | | | | | AVER-AGE | ST. DEV. | CV % |
|---|---|---|---|---|---|---|---|---|---|
| | | 1.8 GHz | 3.9 GHz | 10 GHz | 39.5 GHz | 72 GHz | | | |
| EX. 9 | 1.0 | | | | | | 590 | 456 | 77.4 |
| EX. 10 | 1.8 | | 1100 | | | | | | |
| EX. 11 | 2.8 | | | | 220 | | | | |
| EX. 12 | 4.1 | 450 | | | | | | | |

COMPARATIVE EXAMPLES 1-4

Three stacks were made having different thicknesses and consisting of a plurality of laminae each having an areal density of about 35 g/m². The laminae consisted of unidirectionally aligned UHMWPE fibers known as Dyneema® SK66 with a strength if 32.5 cN/dtex, a modulus of 1015 cN/dtex and a fineness of 1 dpf and an aspect ratio of about 5. Each laminae also contains 20 wt % matrix material based on the total weight of the laminae which. The matrix material was Kraton™ and was applied from a aqueous dispersion. Kraton is a styrene-isoprene-styrene triblock copolymer. The stack was pressed at a temperature of about 125° C. for 15 minutes at a pressure of about 7 MPa. The electromagnetic properties of the compressed stack are presented in Table 4. The products of these experiments are comparable with those reported by H. P. J. de Vries et al.

TABLE 4

| | Thick-ness (mm) | Dielectric loss (radians) × e$^{-5}$ for specific frequencies | | | | | AVER-AGE | ST. DEV. | CV % |
|---|---|---|---|---|---|---|---|---|---|
| | | 1.8 GHz | 3.9 GHz | 10 GHz | 39.5 GHz | 72 GHz | | | |
| C. EX. 1 | 1 | | | | | | 800 | 464 | 58.11 |
| C. EX. 2 | 2 | | | 910 | | | | | |
| C. EX. 3 | 3 | | | | 290 | N/M | | | |
| C. EX. 4 | 4 | 1200 | | | | | | | |

Comparative Examples from Literature for Radomes Based on Composite Materials Containing Polyethylene Fibers and Matrix

| | Dielectric loss (radians) × e$^{-5}$ for specific frequencies | | |
|---|---|---|---|
| | 10 MHz | Around 10 GHz | More than 72 GHz |
| H. P. J. de Vries et al. | 20 | | |
| Chia-Lun J. Hu et al. | | 200 | |
| David S. Cordova et al. | | 440 | |
| NASA Tech Memo 110344 | | | 2000 |

A water jet cut equipment was used to shape and prepare all the materials for testing. The cut edges of the material were sealed with silicone rubber to prevent moisture rooting and water absorption.

N/M=not measurable due to unwanted multiple reflections and resonance effects.

The invention claimed is:

1. A material comprising:
   at least one laminate component containing a fabric formed of ultrahigh molecular weight polyethylene (UHMWPE) fibers, wherein
   the at least one laminate comprises at least two laminae and is substantially free of any binder or matrix, and wherein
   the material has an average loss tangent of less than $8 \times 10^{-3}$ radians as measured at frequencies of 1.8 GHz; 3.9 GHz; 10 GHz; 39.5 GHz; and 72 GHz, the average loss tangent being a value of the loss tangent which is an average of loss tangent values obtained by measuring the loss tangent at each of the frequencies.

2. The material of claim 1, wherein the fabric formed of the UHMWPE fibers is a fabric selected from the group consisting of woven fabrics, knitted fabrics, plaited fabrics, braided fabrics, non-woven fabrics and combinations thereof.

3. The material of claim 1, wherein the at least one laminate component comprises at least one laminae which comprised of a woven fabric of polymeric fibers or polymeric tapes.

4. The material of claim 1, wherein the at least one laminate component has a flexural strength of at least 50 MPa.

5. The material of claim 1, wherein the at least one laminate component comprises an upper surface and a lower surface opposite to the upper surface, and wherein the at least one laminate component includes a polymeric coating on at least the upper surface.

6. The material of claim 5, wherein the polymeric coating has a thickness of at least 0.5 μm.

7. The material of claim 1, wherein the material has thickness of at least 100 μm.

8. The material of claim 5, wherein at least one laminate component includes a polymeric coating on both said upper and lower surfaces.

9. The material of claim 8, wherein the polymeric coating has a thickness of at least 0.5 μm.

10. A radome wall comprising the material of claim 1.

11. A radome comprising the material of claim 1.

12. An electromagnetic window comprising the material of claim 1.

13. A process for manufacturing the material of claim 1, comprising the steps of:
   (a) providing at least one laminae comprising a fabric formed of ultrahigh molecular weight polyethylene (UHMWPE) fibers;
   (b) providing at least one pre-formed polymeric film;
   (c) stacking the at least one laminae to obtain a laminae-stack having an upper surface and a lower surface, which is opposite to the upper surface, and placing the at least one pre-formed polymeric film at least on the upper surface to create an assembly containing the laminae-stack and the pre-formed polymeric film;
   (d) compressing the assembly of step (c) for a dwell time at a pressure of at least 100 bars and at a temperature of less than a melting temperature of the UHMWPE fibers forming the fabric;
   (e) cooling the assembly to below 70° C., followed by releasing the pressure; and
   (f) removing the pre-formed polymeric film from the assembly.

14. The process of claim 13, wherein step (e) is practiced by cooling the assembly to room temperature.

15. The process of claim 13, wherein the pre-formed polymeric film comprises a polyvinyl-based material.

16. The process of claim 15, wherein the polyvinyl-based material is a polyvinyl chloride material or a silicone-based material.

17. A compressed laminae-stack obtained by the process of claim 13.

* * * * *